(12) United States Patent
Lai et al.

(10) Patent No.: US 9,304,249 B2
(45) Date of Patent: Apr. 5, 2016

(54) LIGHT TUNNEL AND MANUFACTURING METHOD THEREOF

(71) Applicant: DELTA ELECTRONICS, INC., Taoyuan Hsien (TW)

(72) Inventors: Tu-Fa Lai, Taoyuan Hsien (TW); Kuang-Cheng Hsu, Taoyuan Hsien (TW); Chun-Chieh Hung, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 583 days.

(21) Appl. No.: 13/734,473

(22) Filed: Jan. 4, 2013

(65) Prior Publication Data

US 2014/0016219 A1    Jan. 16, 2014

Related U.S. Application Data

(60) Provisional application No. 61/670,743, filed on Jul. 12, 2012.

(51) Int. Cl.
*G02B 6/00* (2006.01)
*F21V 8/00* (2006.01)
*G03B 21/20* (2006.01)

(52) U.S. Cl.
CPC ............ *G02B 6/0096* (2013.01); *G03B 21/208* (2013.01); *Y10T 29/49826* (2015.01)

(58) Field of Classification Search
CPC ........ F21V 8/00; G02B 6/0096; G03B 21/208
See application file for complete search history.

(56) References Cited

U.S. PATENT DOCUMENTS

| 2002/0118946 | A1 | 8/2002 | Wagner |
| 2004/0126077 | A1 | 7/2004 | Strobl et al. |
| 2008/0118215 | A1* | 5/2008 | Chen ................ G02B 6/0096 385/133 |

* cited by examiner

*Primary Examiner* — Jennifer L. Doak
(74) *Attorney, Agent, or Firm* — Kirton McConkie; Evan R. Witt (57) ABSTRACT

A light tunnel for use in an optical projection system, comprising: a plurality of reflecting plates, each said reflecting plate being disposed between and connected to the other two said reflecting plates, so that a light passage with a hollow structure is defined by said plurality of reflecting plates. At least one of said reflecting plates has a first surface in an inclined structure, said reflecting plate having said first surface is disposed between and obliquely connected to the other two said reflecting plates for forming said light passage having a non-rectangular cross section, and said first surface of said reflecting plate is abutted against an adjoined reflecting plate to form a junction with no gap between said first surface of said reflecting plate and said adjoined reflecting plate.

8 Claims, 8 Drawing Sheets

LIGHT TUNNEL AND MANUFACTURING METHOD THEREOF

CROSS-REFERENCE TO RELATED APPLICATION

This application claims the benefit of U.S. Provisional Application No. 61/670,743 filed on Jul. 12, 2012, and entitled "LIGHT TUNNEL AND MANUFACTURING METHOD THEREOF", the entirety of which is hereby incorporated by reference.

FIELD OF THE INVENTION

The present invention relates to an optical element and the manufacturing method thereof, and more particularly to a light tunnel applicable to an optical engine of an optical projection system and the manufacturing method thereof.

BACKGROUND OF THE INVENTION

As known, an optical projection system is widely applied to presentation and entertainment. Generally, a light uniforming device is employed in an optical projection system to collect the input light emitted from a light source and uniformize brightness distribution of the light at the output. At present, the light uniforming device is known as a light tunnel. The light tunnel can be utilized to uniformly and precisely project light passing therethrough to an effective area of a light source modulating device to prevent uninformed brightness at a particular light path of the light engine.

Figure 1A:
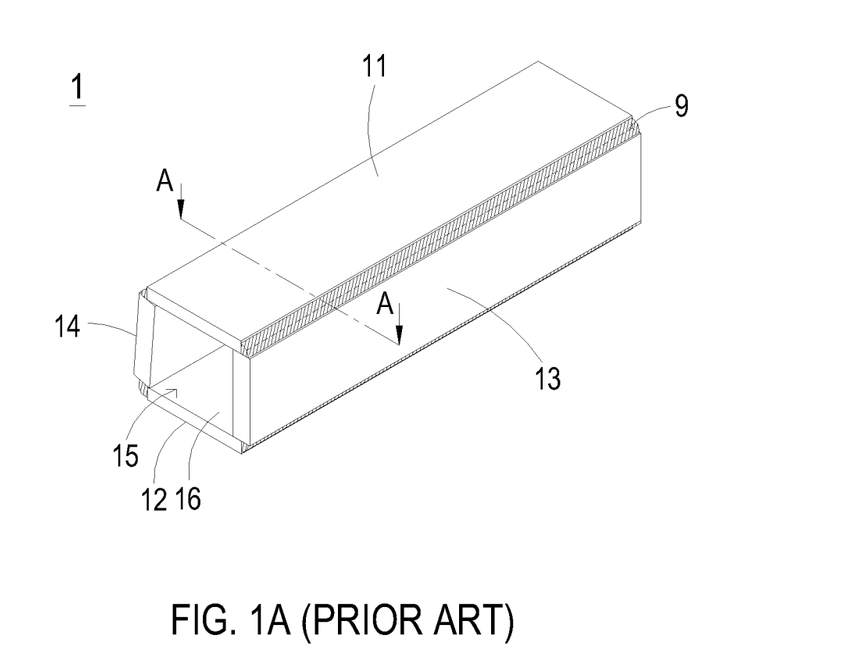
FIG. 1A is a schematic view of a conventional light tunnel.
Figure 1B:
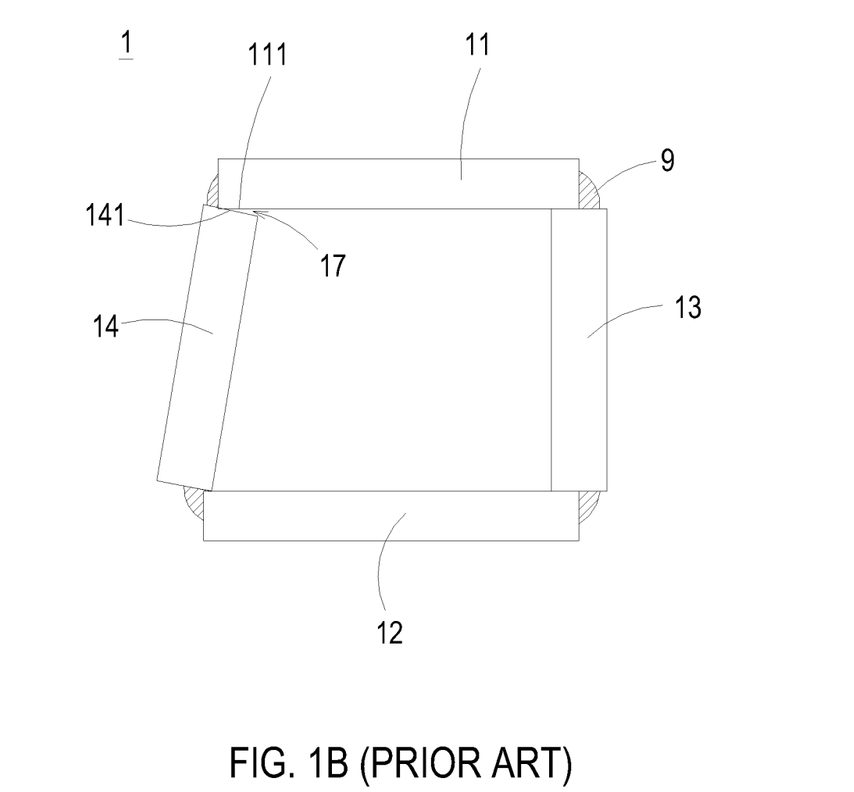
FIG. 1B is a cross-sectional view of the light tunnel along line A-A of FIG. 1A.

FIG. 1A is a schematic view of a conventional light tunnel; and FIG. 1B is a cross-sectional view of the light tunnel along line A-A of FIG. 1A. As shown in FIG. 1A and FIG. 1B, the light tunnel 1 is a hollow cuboid structure formed by connecting four stripped reflecting plates (i.e. mirror) including a top reflecting plate 11, a bottom reflecting plate 12, a right reflecting plate 13 and a left reflecting plate 14. To assemble the light tunnel 1, each reflecting plate is connected to an adjacent reflecting plate at edge. By abutting the right reflecting plate 13 and the left reflecting plate 14 against the top reflecting plate 11 and the bottom reflecting plate 12, a light passage 15 with a light entrance 16 and a light exit (not shown) is formed. An adhesive 9, for example epoxy, silicon rubber or ultraviolet (UV)-curved adhesive, is applied at the external junctions of the connected reflecting plates 11, 12, 13 and 14 so that the top reflecting plate 11, the bottom reflecting plate 12, the right reflecting plate 13 and the left reflecting plate 14 can be connected together to form the light tunnel 1.

Figure 2:
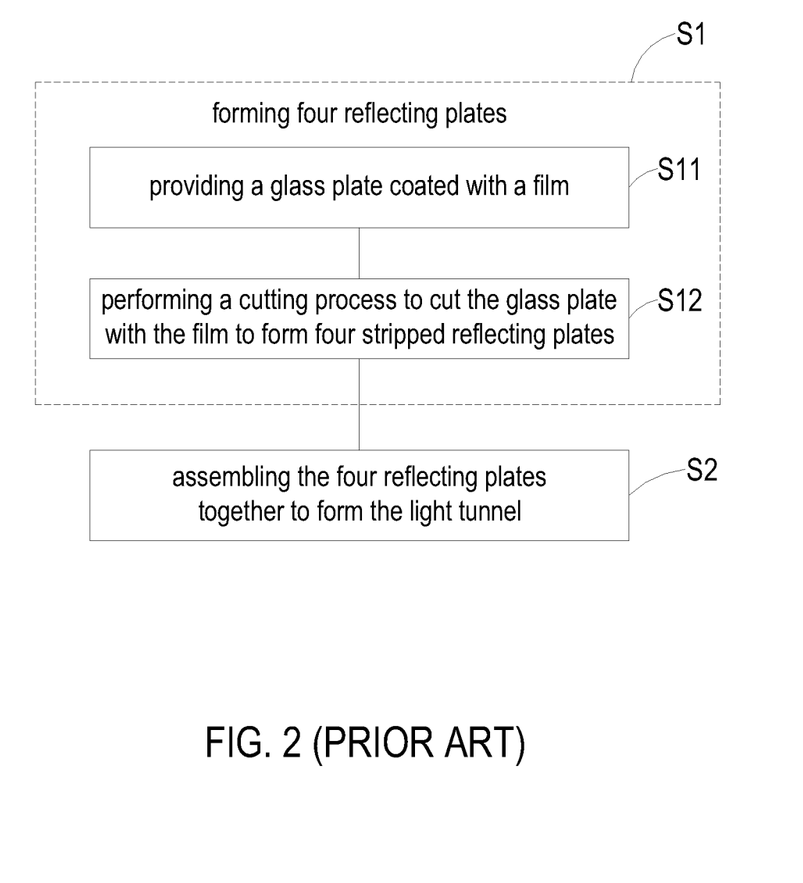
FIG. 2 is a flowchart showing the process of manufacturing the conventional light tunnel.

FIG. 2 is a flowchart showing the process of manufacturing the conventional light tunnel. Referring to FIGS. 1A, 1B and 2, the process of manufacturing the conventional light tunnel 1 is described as below. Firstly, at the step S1, four reflecting plates are formed. The four reflecting plates include a top reflecting plate 11, a bottom reflecting plate 12, a right reflecting plate 13 and a left reflecting plate 14, and all of the top reflecting plate 11, the bottom reflecting plate 12, the right reflecting plate 13 and the left reflecting plate 14 are rectangular solid components. Then, at the step S2, the top reflecting plate 11, the bottom reflecting plate 12, the right reflecting plate 13 and the left reflecting plate 14 are assembled together to form the light tunnel 1.

At the step S1, the process of forming the top reflecting plate 11, the bottom reflecting plate 12, the right reflecting plate 13 and the left reflecting plate 14 includes the following sub-steps. Firstly, at the step S11, a glass plate coated with a film is provided. Then, at the step S12, the glass plate with the film is cut by performing a cutting process so that four stripped reflecting plates are formed. The four reflecting plates include the top reflecting plate 11, the bottom reflecting plate 12, the right reflecting plate 13 and the left reflecting plate 14. Each of the top reflecting plate 11, the bottom reflecting plate 12, the right reflecting plate 13 and the left reflecting plate 14 is a rectangular solid component and has six surfaces, wherein any two adjoined surfaces of the respective reflecting plate are perpendicular with each other.

Due to that each of the top reflecting plate 11, the bottom reflecting plate 12, the right reflecting plate 13 and the left reflecting plate 14 is a rectangular solid component, any two adjoined surfaces of the six surfaces of the respective reflecting plate are perpendicular with each other. When the top reflecting plate 11, the bottom reflecting plate 12, the right reflecting plate 13 and the left reflecting plate 14 are assembled to form the light tunnel 1 and a light passage 15 of the light tunnel 1 having a non-rectangular cross section is required, the left reflecting plate 14 must be obliquely disposed between the top reflecting plate 11 and the bottom reflecting plate 12 to form the light passage 15 having a non-rectangular cross section, as shown in FIG. 1B. However, there will be a gap (i.e. clearance) 17 formed at a junction between a first surface 141 of the left reflecting plate 14 and a bottom surface 111 (i.e. inner surface) of the top reflecting plate 11 due to that the left reflecting plate 14 is a rectangular solid component. Namely, an acute angle is formed between the first surface 141 of the left reflecting plate 14 and the bottom surface 111 of the top reflecting plate 11. The gap 17 will result in the brightness degradation to deteriorate optical quality of the light tunnel 1 and dark lines formed on the display image to degenerate the image quality of the optical projection system.

SUMMARY OF THE INVENTION

It is an object of the present invention to provide a light tunnel applicable to an optical projection system and the manufacturing method thereof. The inventive light tunnel has a light passage having a non-rectangular cross section and no gap is formed at the junction between two connected reflecting plates of the light tunnel so that the brightness and optical quality of the light tunnel is enhanced, the dark lines formed on the display image can be prevented, and the image quality of the optical projection system is improved.

According to one aspect of the present invention, a light tunnel for use in an optical projection system is provided. The light tunnel comprises a plurality of reflecting plates. Each reflecting plate is disposed between and connected to the other two reflecting plates, so that a light passage with a hollow structure is defined by the plurality of reflecting plates. At least one of the reflecting plates has a first surface in an inclined structure, and the reflecting plate having the first surface is disposed between and obliquely connected to the other two reflecting plates for forming the light passage having a non-rectangular cross section. The first surface of the reflecting plate is abutted against an adjoined reflecting plate to form a junction with no gap between the first surface of the reflecting plate and the adjoined reflecting plate.

According to another aspect of the present invention, a method of manufacturing a light tunnel is provided. The manufacturing method comprises the steps of: (a) forming a plurality of reflecting plates, wherein one of the reflecting plates has a first surface in an inclined structure; (b) connecting the plurality of reflecting plates with each other to form the light tunnel, wherein each reflecting plate is disposed between and connected to the other two reflecting plates so as to form a light passage with a hollow structure, wherein the reflecting plate having the first surface is disposed between and obliquely connected to the other two reflecting plates for forming the light passage having a non-rectangular cross section, and wherein the first surface of the reflecting plate is abutted against an adjoined reflecting plate to form a junction with no gap between the first surface of the reflecting plate and the adjoined reflecting plate.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3A:
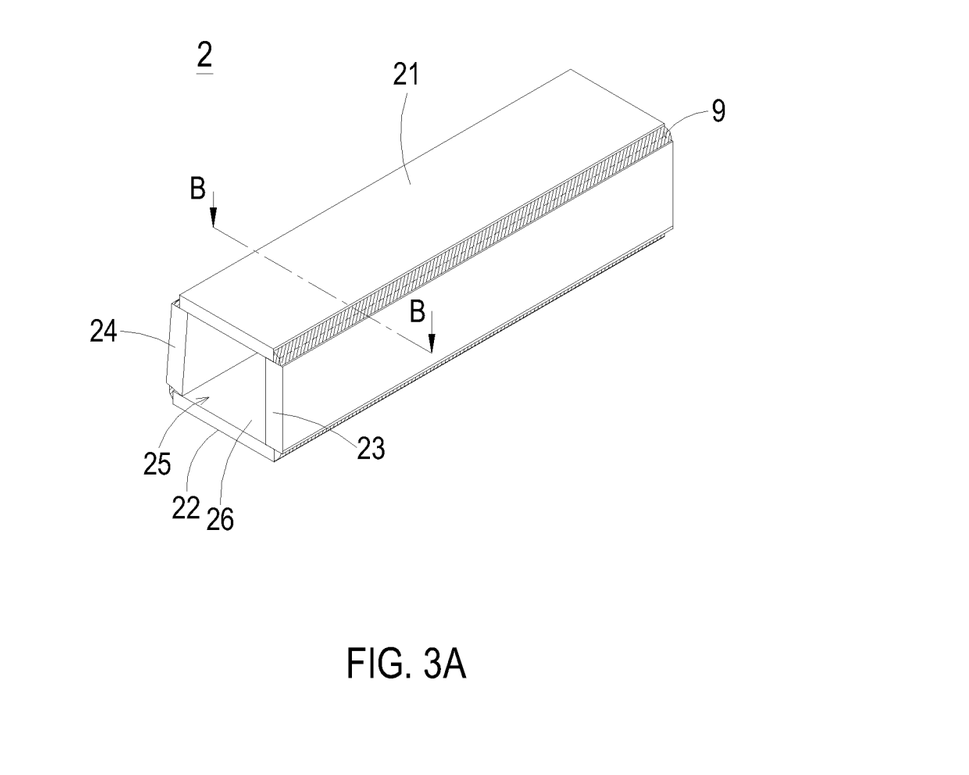
FIG. 3A is a schematic view of a light tunnel according to one preferred embodiment of the present invention.
Figure 3B:
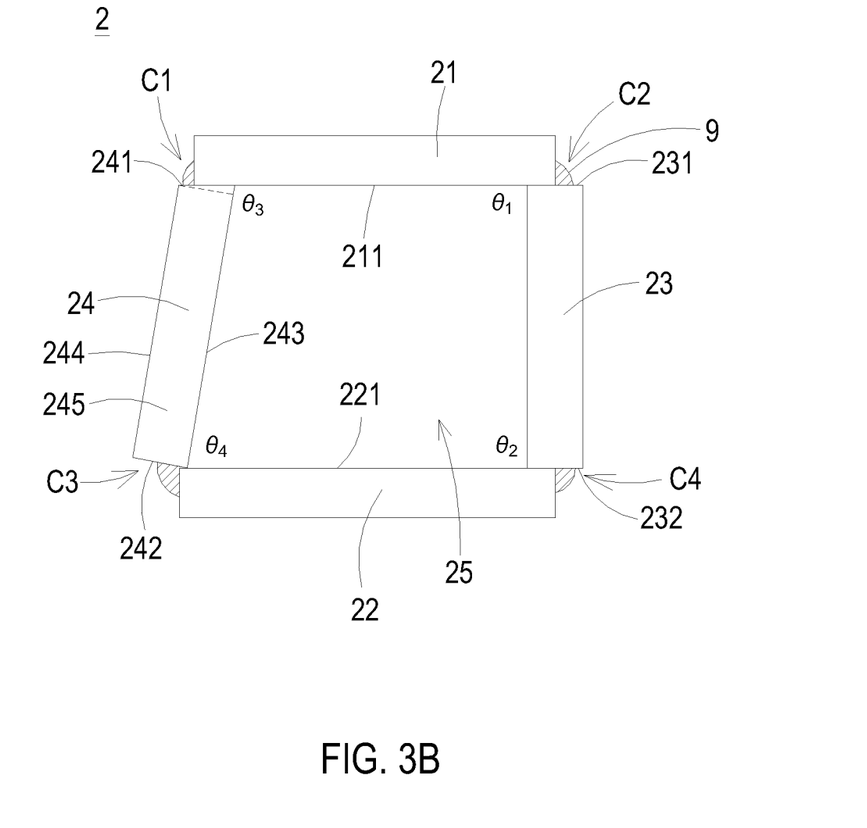
FIG. 3B is a cross-sectional view of the light tunnel along line A-A of FIG. 3A.

FIG. 3A is a schematic view of a light tunnel according to one preferred embodiment of the present invention; and FIG. 3B is a cross-sectional view of the light tunnel along line B-B of FIG. 3A. As shown in FIG. 3A and FIG. 3B, the light tunnel 2 is applicable to an optical engine of an optical projection system (not shown) and configured to collect light and uniformize brightness distribution of the light. The light tunnel 2 comprises a plurality of reflecting plates for example four reflecting plates 21, 22, 23 and 24 and a light passage 25 with a light entrance 26 and a light exit (not shown) defined by the plural reflecting plates 21, 22, 23 and 24. The four reflecting plates include a top reflecting plate 21, a bottom reflecting plate 22, a right reflecting plate 23 and a left reflecting plate 24 (i.e. the first, second, third and fourth reflecting plate, respectively). Each of the reflecting plates has six surfaces and is made up of a nonopaque glass or an opaque glass coated with a reflective film, but it isn't limited thereto.

Figure 4:
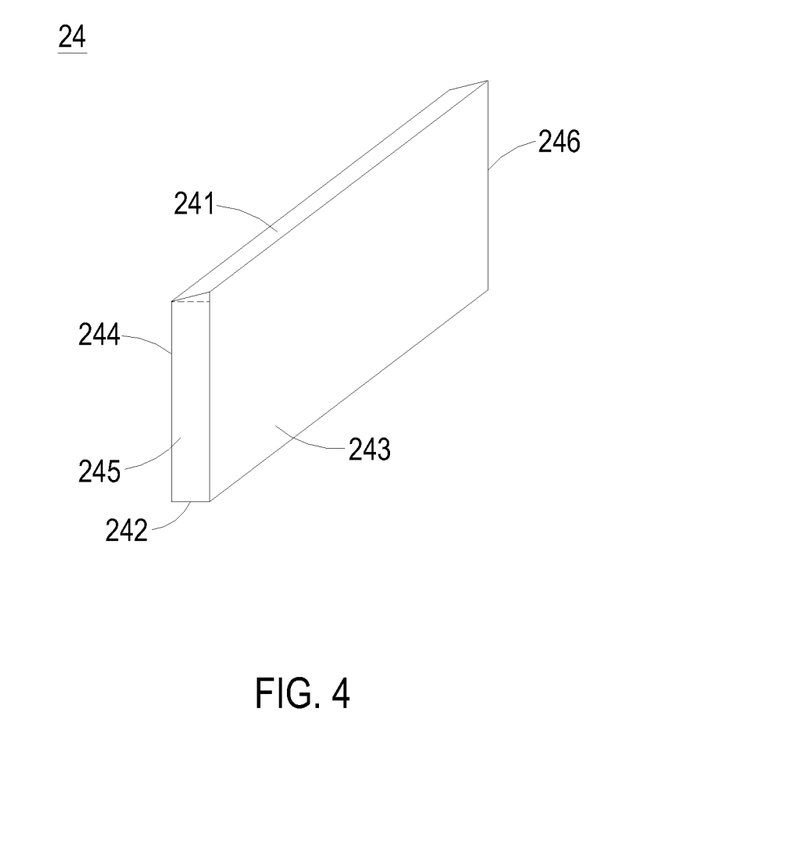
FIG. 4 is a schematic view of the left reflecting plate of the light tunnel of FIGS. 3A and 3B.

In an embodiment, the top reflecting plate 21 and the bottom reflecting plate 22 are opposite and parallel to each other and may have the same or similar shape. The right reflecting plate 23 and the left reflecting plate 24 are opposite to each other and disposed between the top reflecting plate 21 and the bottom reflecting plate 22. The right reflecting plate 23 and the left reflecting plate 24 are connected with the top reflecting plate 21 and the bottom reflecting plate 22 to form the light passage 25. To form a light passage 25 having a non-rectangular cross section parallel to the light entrance 26, at least one of the right reflecting plate 23 and the left reflecting plate 24 can be disposed between and obliquely connected to the top reflecting plate 21 and the bottom reflecting plate 22. In an embodiment as shown in FIG. 4, the left reflecting plate 24 is disposed between and obliquely connected with the top reflecting plate 21 and the bottom reflecting plate 22. The right reflecting plate 23 is disposed between and vertically connected with the top reflecting plate 21 and the bottom reflecting plate 22. Therefore, a light passage 25 having a non-rectangular cross section, for example a trapezoid cross section, can be formed and defined by the top reflecting plate 21, the bottom reflecting plate 22, the right reflecting plate 23 and the left reflecting plate 24. In an embodiment, the assembly of the top reflecting plate 21, the bottom reflecting plate 22, the right reflecting plate 23 and the left reflecting plate 24 can be performed by using an interior position method. Firstly, a jig, which can define the region of the light passage 25, is provided. Then, the top reflecting plate 21, the bottom reflecting plate 22, the right reflecting plate 23 and the left reflecting plate 24 are provided to closely abut against the jig. Finally, an adhesive is applied at the external junctions of the connected reflecting plates 21, 22, 23 and 24 so that the four reflecting plates 21, 22, 23 and 24 can be connected to each other to form the light tunnel 2. Alternatively, the assembly of the top reflecting plate 21, the bottom reflecting plate 22, the right reflecting plate 23 and the left reflecting plate 24 can be performed by using an external position method.

When the top reflecting plate 21, the bottom reflecting plate 22, the right reflecting plate 23 and the left reflecting plate 24 are connected to each other to form the light tunnel 2, the right reflecting plate 23 is connected with (i.e. adhered to) the top reflecting plate 21 at a first angle $\theta_1$. The right reflecting plate 23 is connected with the bottom reflecting plate 22 at a second angle $\theta_2$. The left reflecting plate 24 is connected with the top reflecting plate 21 at a third angle $\theta_3$. The left reflecting plate 24 is connected with the bottom reflecting plate 22 at a fourth angle $\theta_4$. The right reflecting plate 23 is disposed between and vertically connected to the top reflecting plate 21 and the bottom reflecting plate 22, so that the first angle $\theta_1$ and the second angle $\theta_2$ are right angles, respectively. The left reflecting plate 24 is disposed between and obliquely connected to the top reflecting plate 21 and the bottom reflecting plate 22, so that the third angle $\theta_3$ and the fourth angle $\theta_4$ are obtuse angle and acute angle, respectively. The total sum of the first angle $\theta_1$, the second angle $\theta_2$, the third angle $\theta_3$, and the fourth angle $\theta_4$ is about 360 degrees. Namely, the light passage 25 of the light tunnel 2 defined by the top reflecting plate 21, the bottom reflecting plate 22, the right reflecting plate 23 and the left reflecting plate 24 has a non-rectangular cross section for example a trapezoid cross section and has four inner angles including the first angle $\theta_1$, the second angle $\theta_2$, the third angle $\theta_3$, and the fourth angle $\theta_4$.

FIG. 4 is a schematic view of the left reflecting plate of the light tunnel of FIGS. 3A and 3B. As shown in FIGS. 3A, 3B and 4, the left reflecting plate 24 and/or the right reflecting plate 23, which are disposed between and obliquely connected to the top reflecting plate 21 and the bottom reflecting plate 2, has at least one surface in an inclined structure. In an embodiment as shown in FIG. 4, the left reflecting plate 24 disposed between and obliquely connected to the top reflecting plate 21 and the bottom reflecting plate 22 has a first surface 241, a second surface 242, a third surface 243, a fourth surface 244, a front surface 245 and a rear surface 246. The first surface 241 is opposite to the second surface 242. The first surface 241 and the second surface 242 are adjacent to the third surface 243 and the fourth surface 244. The first surface 241 is an inclined surface and is inclined downwardly from the third surface 243 to the fourth surface 244, so that an acute angle is formed between the first surface 241 and the third surface 243 and an obtuse angle is formed between the first surface 241 and the fourth surface 244. The second surface 242 is vertically connected to the third surface 243 and the fourth surface 244. One of the vertical connection edge of the second surface 242 and the third surface 243 and the vertical connection edge of the second surface 242 and the fourth surface 244 is abutted against the bottom reflecting plate 22. In an embodiment as shown in FIG. 3B, the vertical connection edge of the second surface 242 and the third surface 243 is abutted against the bottom reflecting plate 22. The third surface 243 is opposite to the fourth surface 244 and adjacent to the first surface 241 and the second surface 242. The third surface 243 is located in the light passage 25 of the light tunnel 2 and served as one inner sidewall of the light passage 25 of the light tunnel 2. The front surface 245 is opposite to the rear surface 246. The front surface 245 is adjacent to the light entrance 26 and the rear surface 246 is adjacent to the light exit. In addition, the front surface 245 and the rear surface 246 are connected to the first surface 241, the second surface 242, the third surface 243 and the fourth surface 244. In an embodiment, the top reflecting plate 21, the bottom reflecting plate 22 and the right reflecting plate 23 are rectangular solid components, and the left reflecting plate 24 is a right-angle trapezoidal solid component, but it isn't limited thereto.

Please refer to FIGS. 3A and 3B. In order to form a light tunnel 2 with a light passage 25 having a non-rectangular cross section for example a trapezoid cross section when the top reflecting plate 21, the bottom reflecting plate 22, the right reflecting plate 23 and the left reflecting plate 24 are assembled, the right reflecting plate 23 needs to be disposed between and vertically connected to the top reflecting plate 21 and the bottom reflecting plate 22, and the left reflecting plate 24 needs to be disposed between and obliquely connected to the top reflecting plate 21 and the bottom reflecting plate 22. The inclined surface (i.e. the first surface 241) of the left reflecting plate 24 is configured to closely abut against a bottom surface 211 of the top reflecting plate 21 for forming a junction with no gap between the left reflecting plate 24 and the top reflecting plate 21. In addition, as shown in FIG. 3B, the upper portion of the inclined surface (i.e. the upper portion of the first surface 241) of the left reflecting plate 24 is closely abutted against the bottom surface 211 of the top reflecting plate 21, and the lower portion of the inclined surface (i.e. the lower portion of the first surface 241) of the left reflecting plate 24 is located at an external area of the light tunnel 2, so that there will be no gap formed at the junction within the light passage 25 and between the left reflecting plate 24 and the top reflecting plate 21. Namely, the junction, which is located within the light passage 25 and between the left reflecting plate 24 and the top reflecting plate 21, can form one inner angle of the light passage 25 for example the third angle $\theta_3$. Therefore, a gap formed at the junction between two connected reflecting plates of the conventional light tunnel can be prevented. The inventive light tunnel has no gap formed at the junction between two connected reflecting plates so that the brightness and optical quality of the light tunnel 2 is enhanced, the dark lines formed on the display image can be prevented, and the image quality of the optical projection system is improved.

Certainly, the cross section profile of the light passage 25 of the light tunnel 2 isn't limited to the cross section profile of the light passage 25 as shown in FIG. 3B. Other alternative cross section profiles of the light passage 25 of the light tunnel 2 can be achieved by adjusting the connection relationships and connection positions of the top reflecting plate 21, the bottom reflecting plate 22, the right reflecting plate 23 and the left reflecting plate 24 according to the practice requirements of the optical projection system. Moreover, in order to avoid that a gap is formed at the junction within the light passage 25 and between two obliquely connected reflecting plates, the oblique reflecting plate has at least one inclined surface to connect with an adjoining reflecting plate by using the connection method as described above.

A first surface 231 of the right reflecting plate 23 and the first surface 241 of the left reflecting plate 24 are abutted against a bottom surface 211 of the top reflecting plate 21, and a second surface 232 of the right reflecting plate 23 and the second surface face 242 of the left reflecting plate 24 are abutted against the top surface 221 of the bottom reflecting plate 22. An external junction is formed between any two adjacent reflecting plates and located at an external area of the light tunnel 2. Namely, a first external junction C1 is formed between the bottom surface 211 of the top reflecting plate 21 and the first surface 241 of the left reflecting plate 24, a second external junction C2 is formed between the bottom surface 211 of the top reflecting plate 21 and the first surface 231 of the right reflecting plate 23, a third external junction C3 is formed between the top surface 221 of the bottom reflecting plate 22 and the second surface 242 of the left reflecting plate 24, and a fourth external junction C4 is formed between the top surface 221 of the bottom reflecting plate 22 and the second surface 232 of the right reflecting plate 23. An adhesive, for example epoxy, silicon rubber or ultra-violet (UV)-curved adhesive, is applied at the external junctions C1~C4 so that the top reflecting plates 21, the bottom reflecting plate 22, the right reflecting plate 23 and the left reflecting plate 24 can be connected with each other to form the light tunnel 2. In addition, each of the top reflecting plates 21, the bottom reflecting plate 22, the right reflecting plate 23 and the left reflecting plate 24 has one surface served as one inner sidewall of the light passage 25 for reflecting light passing through the light tunnel 2.

Figure 5:
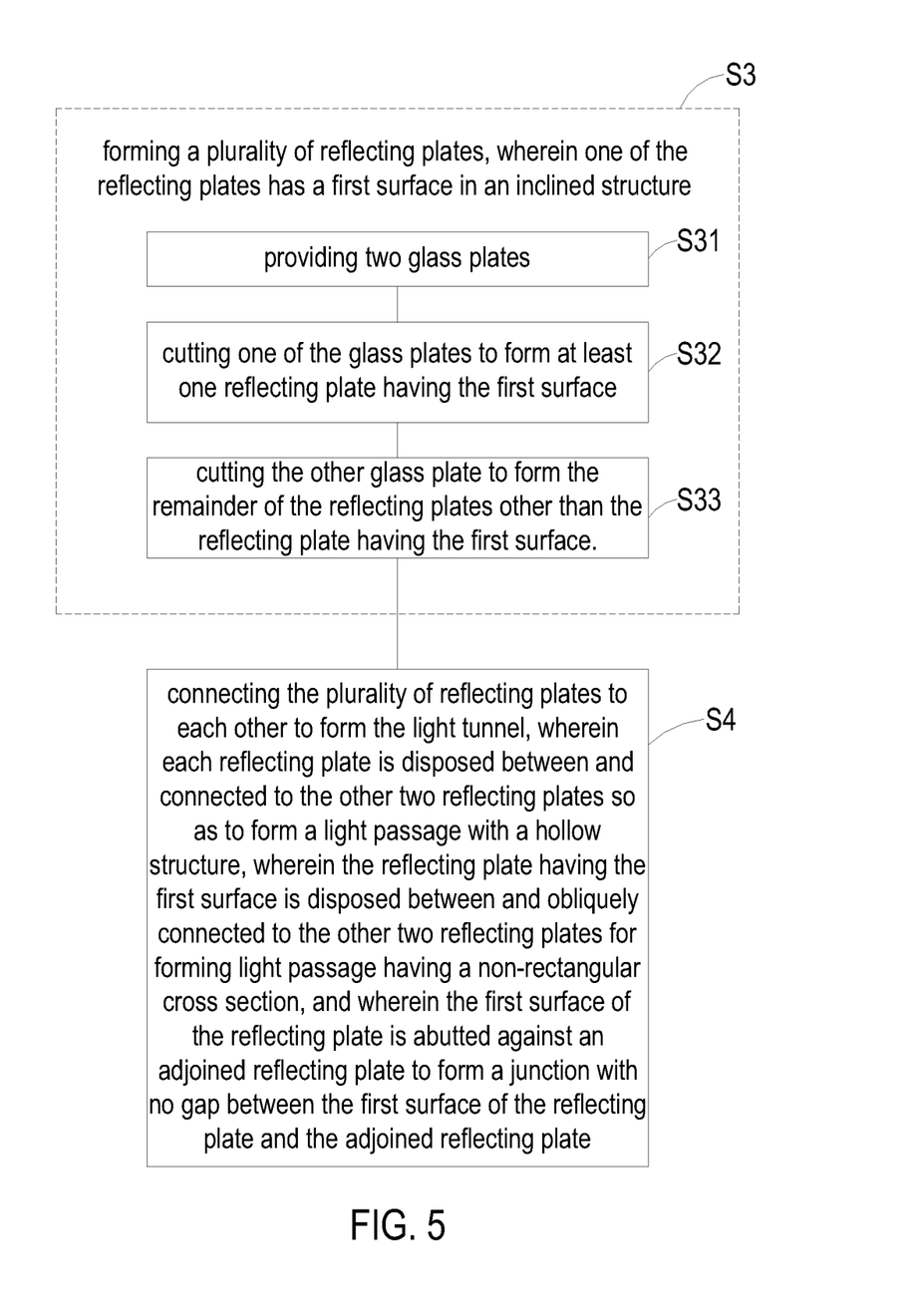
FIG. 5 is a flowchart showing the process of manufacturing the light tunnel of FIG. 3A.

FIG. 5 is a flowchart showing the process of manufacturing the light tunnel of FIG. 3A. Referring to FIGS. 3A, 3B, 4 and 5, the process of manufacturing the light tunnel 2 is described as below. Firstly, at the step S3, a plurality of reflecting plates for example a top reflecting plate 21, a bottom reflecting plate 22, a right reflecting plate 23 and a left reflecting plate 24 are formed, wherein the left reflecting plate 24 has an inclined surface (i.e. first surface 241). Then, at the step S4, the top reflecting plate 21, the bottom reflecting plate 22, the right reflecting plate 23 and the left reflecting plate 24 are connected to each other to form the light tunnel 2 having a light passage 25. The light passage 25 has a non-rectangular cross section, the left reflecting plate 24 having the inclined surface (i.e. the first surface 241) is obliquely connected to the two adjacent reflecting plates for example the top reflecting plate 21 and the bottom reflecting plate 22, and the inclined surface (i.e. the first surface 241) of the left reflecting plate 24 is closely abutted against the bottom surface 211 of the top reflecting plate 21.

At the step S3, the process of forming the top reflecting plate 21, the bottom reflecting plate 22, the right reflecting plate 23 and the left reflecting plate 24 includes the following sub-steps. Firstly, at the step S31, two glass plates coated with reflective films are provided. Then, at the step S32, one of the glass plates is cut to form at least one reflecting plate having a first surface 241 in an inclined structure. In an embodiment, one glass plate with the reflective film is cut to form the left reflecting plate 24 having an inclined surface (i.e. the first surface 241). Thereafter, at the step S33, the other glass plate is cut to form at least one top reflecting plate 21, at least one bottom reflecting plate 22 and at least one right reflecting plate 23. The top reflecting plate 21, the bottom reflecting plate 22 and the right reflecting plate 23 are similar in shape and are rectangular solid. In addition, at the step S4, the right reflecting plate 23 is disposed between and vertically connected to the top reflecting plate 21 and the bottom reflecting plate 22, which are parallel to each other.

Figure 6:
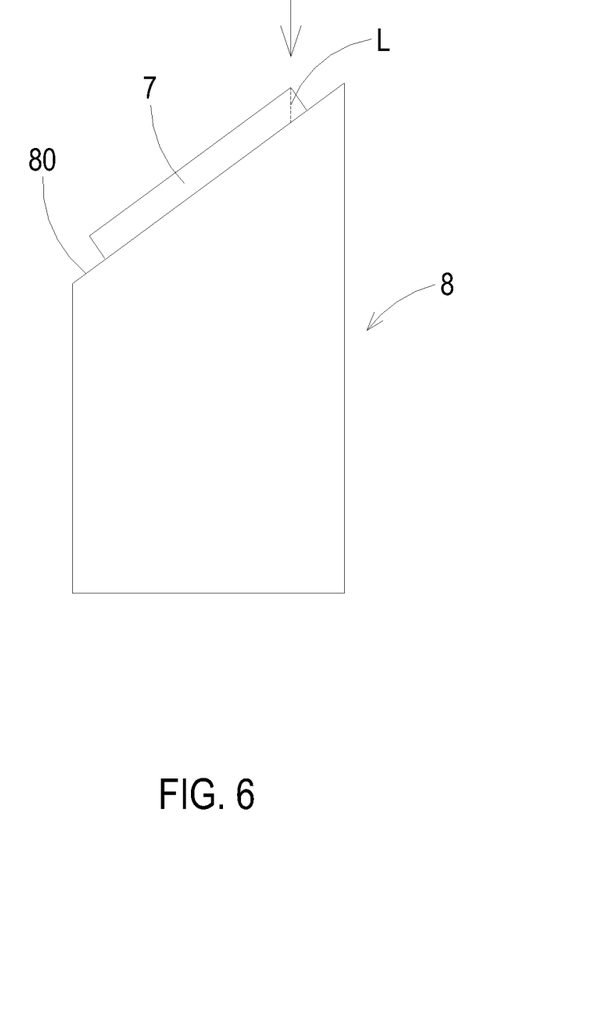
FIG. 6 shows a glass plate is cut to form a left reflecting plate having an inclined surface of FIG. 4.

FIG. 6 shows that a glass plate is cut to form a left reflecting plate of FIG. 4. At the step S32, in order to form at least one left reflecting plate 24 having an inclined surface, the glass plate 7 is placed on an inclined platform 80 of a base 8 of a cutting machine. Then, a cutting knife over the inclined platform 80 and the glass plate 7 is moved downwardly along a direction vertical to a horizontal plane (as indicated in an arrow direction of FIG. 6) to cut one end portion of the glass plate 7. When the end portion of the glass plate 7 is cut alone the cutting line C, an inclined surface is formed at the end portion of the glass plate 7. Thereafter, the glass plate 7 is further cut to form other non-inclined surfaces by using the conventional cutting method so that the at least one left reflecting plate 24 having an inclined surface can be formed. Certainly, the cutting method and cutting machine for cutting the glass plate 7 to form the left reflecting plate 24 having an inclined surface isn't limited to the cutting method and cutting machine as shown in FIG. 6. Other alternative cutting method and cutting machine for example mechanical cutter, water cutter or laser cutter can also be used to form the left reflecting plate 24. In addition, the other glass plate can be cut by using a conventional cutting method and cutting machine to form the top reflecting plate 21, the bottom reflecting plate 22 and the right reflecting plate 23, and it isn't intended to describe repeatedly hereinafter.

From the above description, the present invention provides a light tunnel applicable to an optical projection system and the manufacturing method thereof. The inventive light tunnel has a light passage having a non-rectangular cross section and no gap is formed at the junction between two connected reflecting plates of the light tunnel, so that the brightness and optical quality of the light tunnel is enhanced, the dark lines formed on the display image can be prevented, and the image quality of the optical projection system is improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light tunnel for use in an optical projection system, comprising:

a plurality of reflecting plates, including a top reflecting plate, a bottom reflecting plate, a right reflecting plate and a left reflecting plate, each said reflecting plate being disposed between and connected to the other two said reflecting plates, so that a light passage with a hollow structure is defined by said plurality of reflecting plates;

wherein said left reflecting plates has a first surface, a second surface, a third surface and a fourth surface, wherein said first surface is in an inclined structure, said first surface is obliquely connected to said third surface and said fourth surface, said second surface is opposite to said first surface and vertically connected to said third surface and said fourth surface, said third surface is opposite to said fourth surface, one of a vertical connection edge of said second surface and said third surface is abutted against said bottom reflecting plate, said left reflecting plate is disposed between and obliquely connected to said top reflecting plate and said bottom reflecting plate for forming said light passage having a non-rectangular cross section, and said first surface of said left reflecting plate is abutted against said top reflecting plate to form a junction with no gap between said first surface of said reflecting plate and said top reflecting plate.

2. The light tunnel according to claim 1, wherein said light passage has a trapezoid cross section.

3. The light tunnel according to claim 1, wherein said reflecting plate having said first surface is a right-angle trapezoidal solid component, and the remainder of said reflecting plates are rectangular solid components.

4. The light tunnel according to claim 1, wherein said top reflecting plate, said bottom reflecting plate and said right reflecting plate are rectangular solid components, and said left reflecting plate is a right-angle trapezoidal solid component.

5. The light tunnel according to claim 1, wherein said top reflecting plate and said bottom reflecting are opposite and parallel to each other, and said right reflecting plate is disposed between and vertically connected to said top reflecting plate and said bottom reflecting plate.

6. The light tunnel according to claim 1, wherein a vertical connection edge of said second surface and said fourth surface is abutted against said bottom reflecting plate.

7. The light tunnel according to claim 1, wherein said light passage of said light tunnel has four inner angles, and the total sum of said four inner angles is 360 degrees.

8. The light tunnel according to claim 7, wherein said junction between said reflecting plate having said first surface and said adjoined reflecting plate form one inner angle of said light passage.

* * * * *